(12) United States Patent
Lai et al.

(10) Patent No.: US 9,009,380 B2
(45) Date of Patent: *Apr. 14, 2015

(54) USB TRANSACTION TRANSLATOR WITH SOF TIMER AND USB TRANSACTION TRANSLATION METHOD FOR PERIODICALLY SENDING SOF PACKET

(71) Applicant: VIA Technologies, Inc., New Taipei (TW)

(72) Inventors: Jiin Lai, New Taipei (TW); Chin-Sung Hsu, New Taipei (TW); Terrance Shiyang Shih, New Taipei (TW); Jinkuan Tang, Beijing (CN); Buheng Xu, Beijing (CN); Hui Jiang, Beijing (CN)

(73) Assignee: VIA Technologies, Inc., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/038,717

(22) Filed: Sep. 26, 2013

(65) Prior Publication Data

US 2014/0059267 A1 Feb. 27, 2014

Related U.S. Application Data

(63) Continuation-in-part of application No. 12/959,277, filed on Dec. 2, 2010, now Pat. No. 8,452,909, and a continuation of application No. 13/089,834, filed on Apr. 19, 2011, now Pat. No. 8,572,306.

(51) Int. Cl.
*G06F 13/36* (2006.01)
*G06F 13/40* (2006.01)

(52) U.S. Cl.
CPC ............................. *G06F 13/4059* (2013.01)

(58) Field of Classification Search
USPC ................................................. 710/62–64
See application file for complete search history.

(56) References Cited

U.S. PATENT DOCUMENTS

| | | |
|---|---|---|
| 6,256,687 B1 | 7/2001 | Ellis et al. |
| 6,742,076 B2 | 5/2004 | Wang et al. |
| 6,801,959 B1 | 10/2004 | Crutchfield et al. |
| 6,816,929 B2 | 11/2004 | Ueda |
| 7,409,471 B2 * | 8/2008 | Saito et al. ...................... 710/35 |

(Continued)

OTHER PUBLICATIONS

U.S. Appl. No. 12/959,261, filed Dec. 2, 2010.

(Continued)

*Primary Examiner* — Raymond Phan
(74) *Attorney, Agent, or Firm* — Donald E. Stout; Stout, Uxa & Buyan, LLP

(57) ABSTRACT

A universal serial bus (USB) transaction translator is provided along with a micro-frame synchronization method. A device interface is coupled to a device via a device bus, and a host interface is coupled to a host via a host bus. At least two buffers are configured to store data. A controller stores the data in the buffers alternately. A start-of-frame (SOF) counter is used to count the SOF packets, with the counting value of the SOF counter being compared to a predefined value. Specifically, the controller resets a SOF timer for sending the SOF packet when the counting value achieves or exceeds the predefined value, such that the SOF packet and an isochronous timestamp packet (ITP) from the host are sent at the same time. Further, the controller delays the sending of the SOF packet for a period of time according to the ITP from the host.

20 Claims, 8 Drawing Sheets

(56) References Cited

U.S. PATENT DOCUMENTS

| | | |
|---|---|---|
| 7,818,603 B2 | 10/2010 | Sisolak et al. |
| 8,001,296 B2 | 8/2011 | Saito |
| 8,140,882 B2 | 3/2012 | Lee et al. |
| 8,572,306 B2 * | 10/2013 | Lai et al. .................. 710/310 |
| 2002/0199053 A1 | 12/2002 | Kondoh |
| 2006/0149870 A1 | 7/2006 | Sears et al. |
| 2006/0195625 A1 | 8/2006 | Hesse |
| 2007/0083685 A1 | 4/2007 | Hsu et al. |
| 2009/0240851 A1 | 9/2009 | Saito |
| 2011/0093736 A1 | 4/2011 | Chiang et al. |
| 2011/0119557 A1 | 5/2011 | Chen et al. |
| 2011/0219195 A1 | 9/2011 | Habusha et al. |

OTHER PUBLICATIONS

U.S. Appl. No. 12/959,299, filed Dec. 2, 2010.
U.S. Appl. No. 12/862,134, filed Aug. 24, 2010.

* cited by examiner

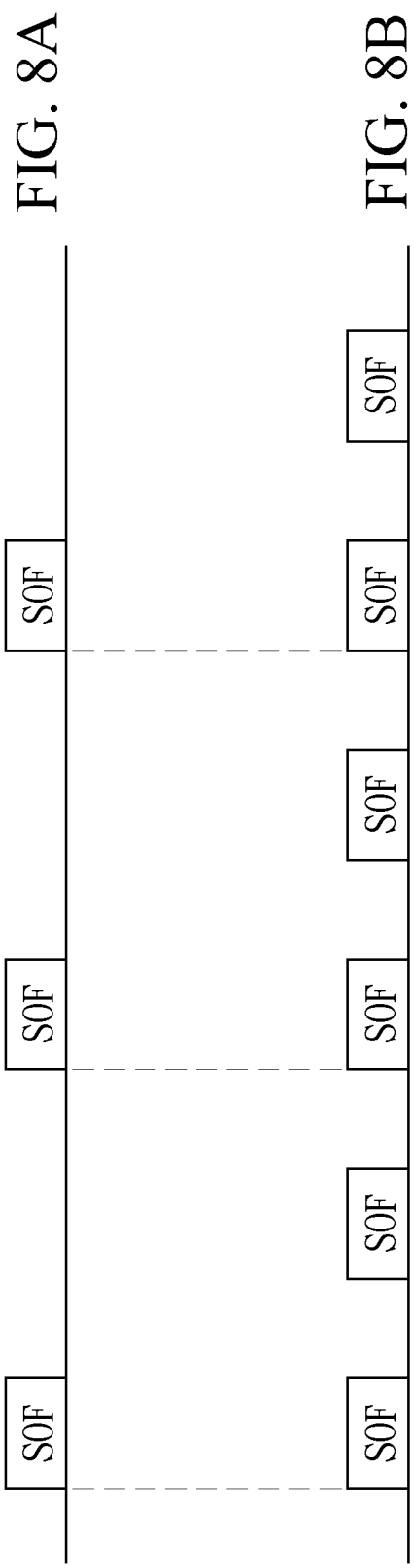

USB TRANSACTION TRANSLATOR WITH SOF TIMER AND USB TRANSACTION TRANSLATION METHOD FOR PERIODICALLY SENDING SOF PACKET

CROSS-REFERENCE TO OTHER APPLICATIONS

This application is a continuation of U.S. patent application Ser. No. 13/089,834, filed on Apr. 19, 2011 and entitled USB TRANSACTION TRANSLATOR AND USB TRANSACTION TRANSLATION METHOD, which is a continuation-in-part of U.S. patent application Ser. No. 12/959,277, filed on Dec. 2, 2010 and entitled USB TRANSACTION TRANSLATOR AND A MICRO-FRAME SYNCHRONIZATION METHOD ADAPTABLE TO AN USB IN ISOCHRONOUS TRANSACTION, which claims priority to China Patent Application No. 201010512069.4, filed on Sep. 30, 2010, the complete subject matter of all which are incorporated herein by reference.

BACKGROUND OF THE INVENTION

1. Field of the Invention

The present invention generally relates to a Universal Serial Bus (USB), and more particularly to a USB 3.0 transaction translator (U3TT) and a micro-frame synchronization method.

2. Description of Related Art

Universal Serial Bus (USB) is a specification of peripheral devices to establish communication between the devices and a host. USB 3.0 was released in 2008, and a USB 3.0 cable is shown in FIG. 1A. In addition to a signal pair D+/D− for USB 2.0 data path, two signal pairs SSTX+/SSTX− and SSRX+/SSRX− are further provided for USB 3.0 SuperSpeed data path.

When a USB 2.0 device is coupled to a USB 3.0 host, communication is performed over the non-SuperSpeed data path D+/D−. The applicant of the present invention discloses a USB 3.0 transaction translator (U3TT) in China Patent Application No. 201010129143.4, the disclosure of which is hereby incorporated by reference. The U3TT 10 as shown in FIG. 1B is coupled between the USB 3.0 host 12 and the USB 2.0 device 14, and is utilized to upgrade the USB 2.0 device to act as a quasi-USB 3.0 device such that data transfer speed can be improved.

USB provides four information transfer types: control transfer, bulk transfer, interrupt transfer and isochronous transfer, among which the isochronous transfer type reserves sufficient bandwidth with guaranteed transfer speed and is commonly used in audio or video data transfer. However, as the isochronous transfer type will not correct errors or retry packets, it cannot guarantee the correctness of transferred data.

As the conventional U3TT stays idle most of the time and the bandwidth usage of the USB 2.0 bus is low when performing IN isochronous transaction, the applicant of the present invention thus discloses an improved U3TT in a co-pending U.S. patent application Ser. No. 12/959,261 entitled USB TRANSACTION TRANSLATOR AND AN ISOCHRONOUS-IN TRANSACTION METHOD. In the improved U3TT, two buffers are used to pre-fetch data to improve the bandwidth usage of the USB 2.0 bus. However, as USB 3.0 micro-frame time (which is 125 μs) at the host side is not synchronized with USB 2.0 micro-frame time, some problems occur.

FIG. 2 shows micro-frame timing diagrams at the host side and device side respectively. At the host side, the host sends isochronous timestamp packet (ITP) every micro-frame to announce its micro-frame time. The host may read data from the buffers, e.g., buffer 1 or buffer 2, at any time during the micro-frame time. At the device side, U3TT sends a start-of-frame (SOF) packet to announce its micro-frame time. The U3TT may controllably perform data pre-fetch during half of the micro-frame time such as the first half of the micro-frame time. As shown in FIG. 2, the host and the device may probably access the same buffer (e.g., the buffer 1) at the same time (e.g., the drawn overlapped period), therefore resulting in access conflict. In this example, the micro-frame at the device side may conflict with the preceding micro-frame at the host side.

Moreover, as the host and the U3TT use different clock sources respectively, a period difference may ordinarily exist between them. The period difference may accumulate to be a substantive difference, therefore resulting in a synchronization problem.

In order to overcome the problems mentioned above, a need has arisen to propose an improved transaction translator and a micro-frame synchronization method to alleviate the synchronization problems.

SUMMARY OF THE INVENTION

In view of the foregoing, it is an object of the embodiment of the present invention to provide a USB 3.0 transaction translator and a micro-frame synchronization method, which not only solve the access conflict problem between the device side and the host side but also alleviate the accumulated clock period difference between the host side and the U3TT. It is another object of the embodiment to improve data transaction efficiency.

According to one embodiment, a Universal Serial Bus (USB) transaction translator includes a device interface, a host interface, at least two buffers, a controller and a start-of-frame (SOF) counter. The device interface is coupled to a device via a device bus, and a host interface is coupled to a host via a host bus, wherein the host has a USB version higher than the USB version of the device. The buffers are configured to store data, and are disposed between the device interface and the host interface. The controller is configured to store the data in the buffers alternately. The SOF counter is configured to count SOF packets, wherein the controller resets a SOF timer for sending a SOF packet when a counting value of the SOF counter achieves the predefined value, such that the SOF packet and an isochronous timestamp packet (ITP) from the host are synchronously sent at the same time. The controller delays the sending of the SOF packet for a period of time according to the ITP from the host.

According to a micro-frame synchronization method adaptable to an IN isochronous transaction method disclosed in another embodiment, a transaction translator resets a start-of-frame (SOF) timer for sending a SOF packet such that the SOF packet and an isochronous timestamp packet (ITP) from a host are synchronously sent at the same time. Subsequently, the sending of the SOF packet is delayed for a period of time according to the received ITP. A number of the SOF packets are counted to result in a counting value. The counting continues when the counting value does not achieve a predefined value; otherwise, when the counting value achieves the predefined value, the step of resetting the SOF timer is performed over again.

According to another embodiment, a USB transaction translator includes a device interface, a host interface, at least one buffer, a controller, a start-of-frame (SOF) timer and a SOF generator. The device interface is coupled to a device via a device bus, and the host interface is coupled to a host via a host bus, wherein the host has a USB version higher than the USB version of the device. The buffer is disposed between the device interface and the host interface for storing data, and the controller is configured to store the data in the buffer. The SOF timer is configured to perform timing control according to a dynamically-adjusted sending period of SOF packets from the controller, and the SOF generator is configured to dynamically generate the SOF packets under control of the controller.

BRIEF DESCRIPTION OF THE DRAWINGS

FIG. 8A shows an exemplary timing diagram illustrative of sending SOF packets according to the specified micro-frame time; and FIG. 8B shows an exemplary timing diagram illustrative of sending SOF packets according to the adjusted micro-frame time.

DETAILED DESCRIPTION OF THE INVENTION

Figure 3:
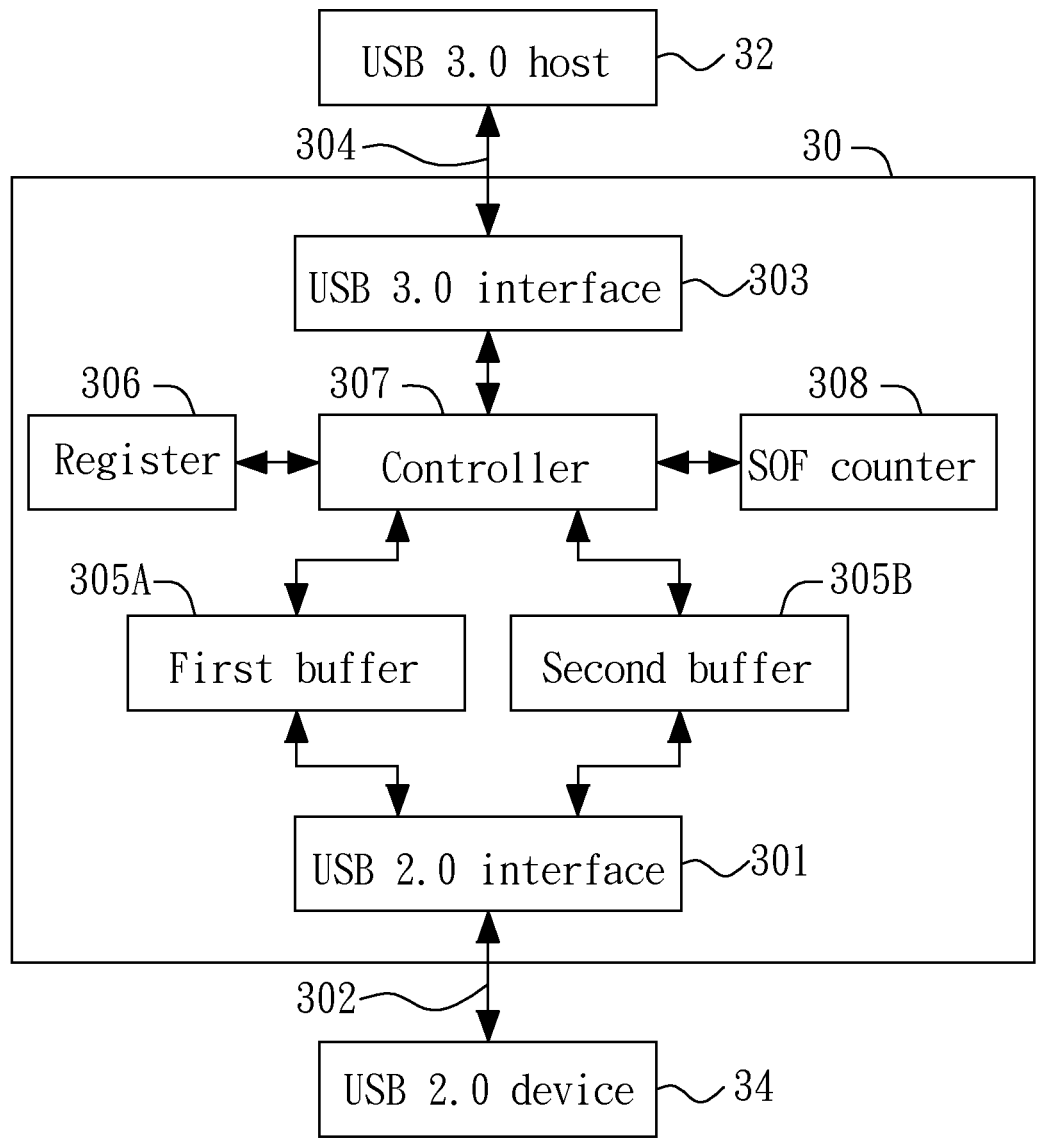
FIG. 3 shows a block diagram of a Universal Serial Bus (USB) 3.0 transaction translator (U3TT) to establish translation between a USB 3.0 host and a USB 2.0 device according to one embodiment of the present invention.

FIG. 3 shows a block diagram of a Universal Serial Bus (USB) 3.0 transaction translator (U3TT) 30 to establish translation between a USB 3.0 host 32 and a USB 2.0 device 34 according to one embodiment of the present invention. The configuration of the constituent blocks of the U3TT 30 is not limited to that shown in FIG. 3. Although the USB 3.0 transaction translator 30 is demonstrated here, the present invention, however, may be adapted to a higher USB version. The U3TT 30 as shown in FIG. 3 only illustrates the constituent blocks that are pertinent to the present invention, while details may be referred to the above-mentioned China patent application and co-pending U.S. patent application. Details of USB 2.0 and USB 3.0 may be referred to "Universal Serial Bus Specification" and "Universal Serial Bus 3.0 Specification" respectively, the disclosures of which are hereby incorporated by reference.

In the embodiment, the U3TT 30 includes a USB 2.0 interface (or "device interface") 301, which is coupled to the device 34 via a USB 2.0 bus (or "device bus") 302 that is used as a signal interface between the U3TT 30 and the device 34. The U3TT 30 also includes a USB 3.0 interface (or "host interface") 303, which is coupled to the host 32 via a USB 3.0 bus (or "host bus") 304 that is used as a signal interface between the U3TT 30 and the host 32.

The U3TT 30 includes two buffers: a first buffer 305A and a second buffer 305B, disposed between the USB 2.0 interface 301 and the USB 3.0 interface 303, for storing data. Although two buffers 305A and 305B are demonstrated in the embodiment, a multiple buffering using three or more buffers may generally be applied. Moreover, the first buffer 305A and the second buffer 305B may have different size according to specific applications.

The U3TT 30 may further include a register 306, which is used to record information such as (device addressable) endpoint number or bandwidth requirement of the USB 2.0 bus 302. A controller 307 of the U3TT 30 not only performs translation but also operates and coordinates the other blocks mentioned above.

In the embodiment, the U3TT 30 includes a start-of-frame (SOF) timer (not shown) for sending SOF packets every period of time to announce its micro-frame time. According to one aspect of the present invention, the U3TT 30 includes a start-of-frame (SOF) counter 308, which is used to count the sent SOF packets. The counting value of the SOF counter 308 is compared to a predefined value. The controller 307 resets the SOF timer for sending the SOF packet when the counting value achieves the predefined value or is greater than the predefined value, such that the SOF packet from U3TT 30 and an isochronous timestamp packet (ITP) from the host are synchronously sent at the same time. The accumulated clock period difference problem mentioned above may accordingly be resolved.

Figure 4:
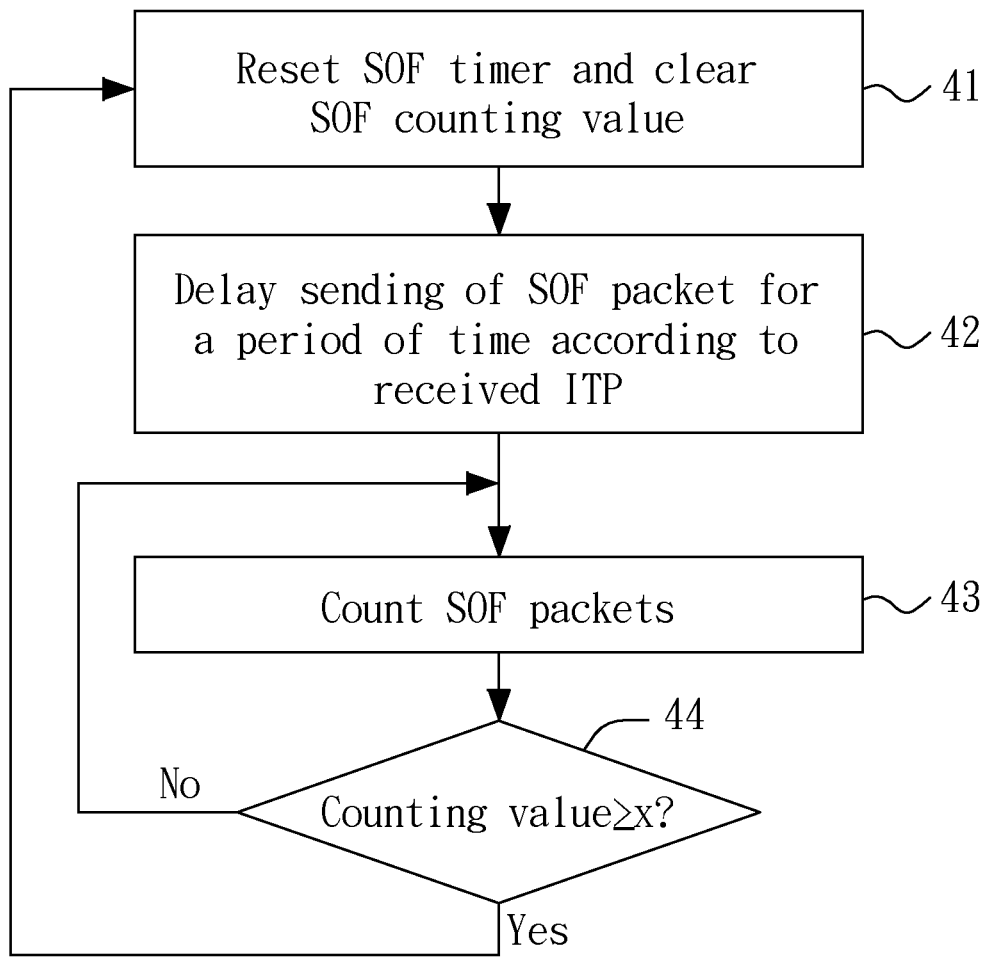
FIG. 4 shows a flow diagram of a micro-frame synchronization method adaptable to IN isochronous transaction according to one embodiment of the present invention.

FIG. 4 shows a detailed flow diagram of a micro-frame synchronization method adaptable to IN isochronous transaction according to one embodiment of the present invention. In step 41, the U3TT 30 resets the SOF timer for sending a SOF packet such that the SOF packet and the ITP are sent at the same time. Further, the counting value of the SOF counter 308 is cleared.

Figure 1A:
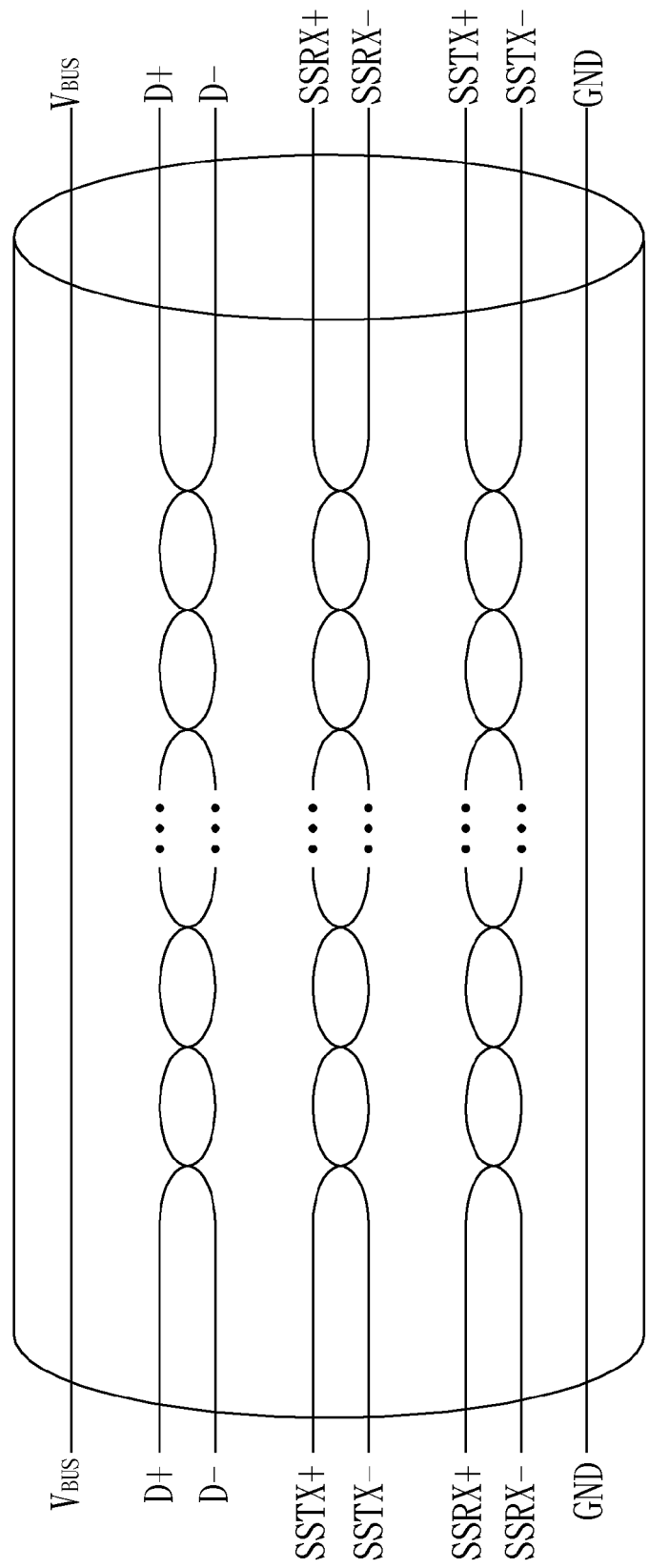
FIG. 1A shows a conventional USB 3.0 cable.
Figure 1B:
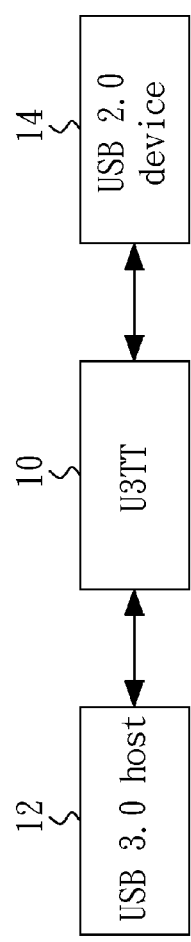
FIG. 1B shows a block diagram illustrating a conventional U3TT coupled between a USB 3.0 host and a USB 2.0 device.
Figure 2:
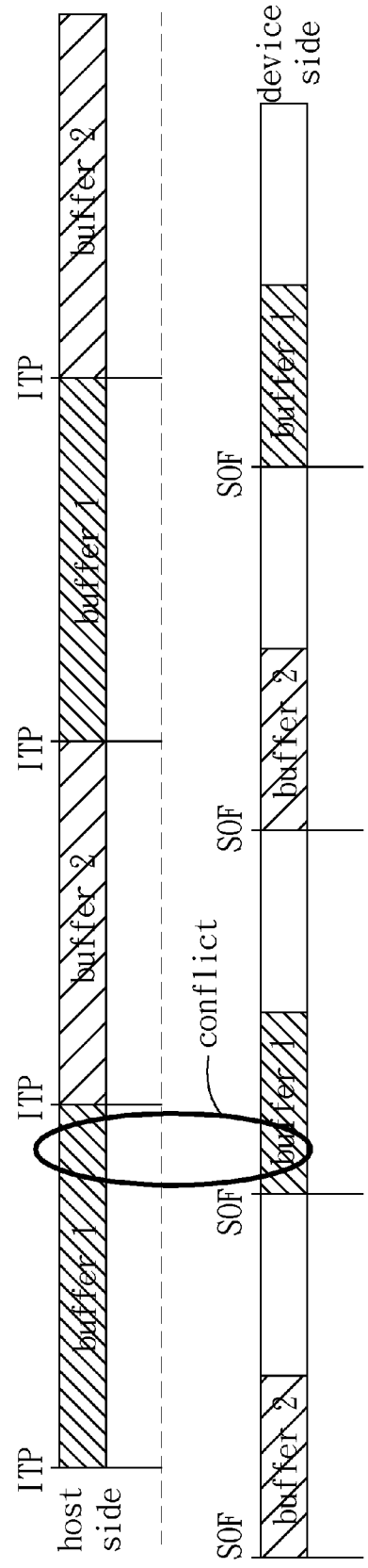
FIG. 2 shows micro-frame timing diagrams at the conventional host side and device side respectively.
Figure 5:
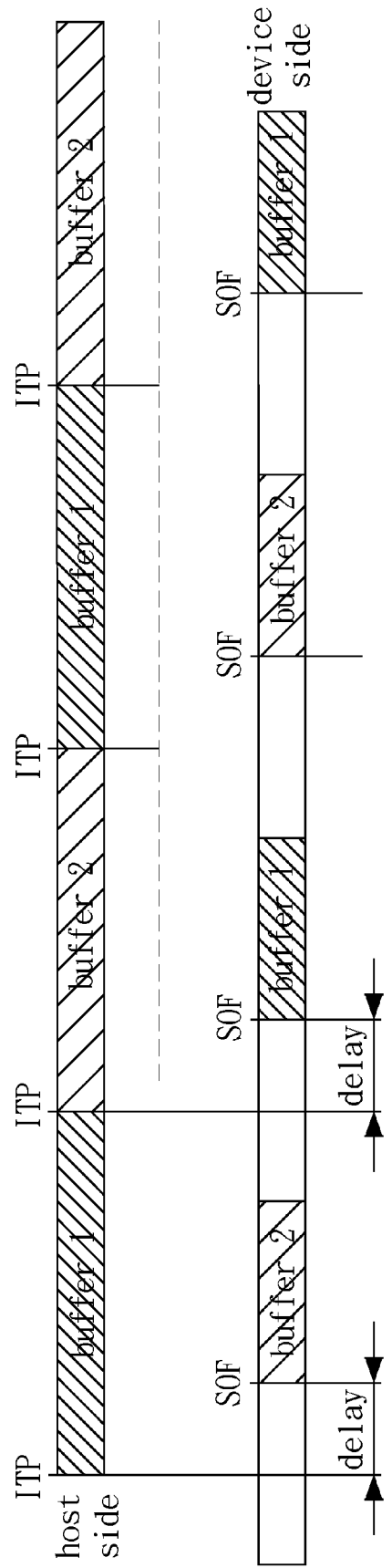
FIG. 5 shows micro-frame timing diagrams at the host side and the device side respectively with delay time.

Subsequently, in step 42, when the U3TT 30 receives the ITP from the host 32, the controller 307 delays the sending of the SOF packet for a period of time according to the received ITP. In general, the delay time is less than one half of the micro-frame time or 62.5 μs, to assure that the USB 2.0 bus 302 accomplishes data transaction within a micro-frame. FIG. 5 shows micro-frame timing diagrams at the host side and the device side respectively with delay time. As shown in the figure, the controller 307 of the U3TT may controllably perform data pre-fetch of the buffers 305A/305B during the first half of each micro-frame. It is observed from FIG. 5 that the delayed micro-frame at the device side no longer overlaps with a preceding micro-frame at the host side as illustrated in FIG. 2.

In step 43, the SOF packets are counted. The SOF counter 308 continues counting when the counting value is not greater than a predefined value x (step 44); otherwise, when the counting value achieves the predefined value x or is greater than the predefined value x, then returns to the step 41, the SOF timer is reset and the SOF counter 308 is cleared. In an extreme case that the predefined value x is set as "1," the SOF timer is reset whenever the ITP is received. In the embodiment, the above-mentioned comparing and clear operations are performed by the controller 307 in the U3TT 30 in the FIG. 3.

Figure 6:
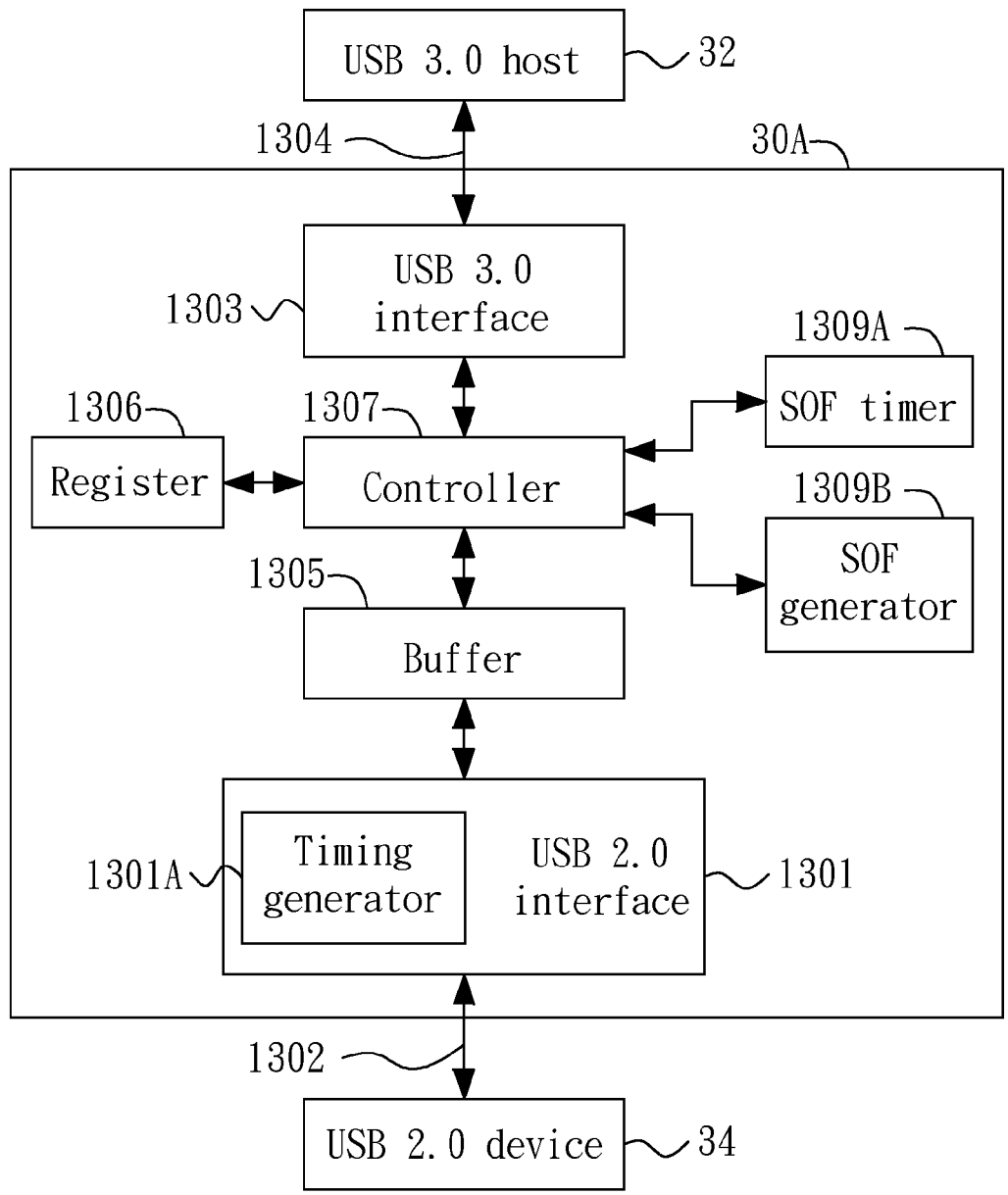
FIG. 6 shows a block diagram of a Universal Serial Bus (USB) 3.0 transaction translator (U3TT) to establish translation between a USB 3.0 host and a USB 2.0 device according to another embodiment of the present invention.

FIG. 6 shows a block diagram of a Universal Serial Bus (USB) 3.0 transaction translator (U3TT) 30A to establish translation between a USB 3.0 host 32 and a USB 2.0 device 34 according to another embodiment of the present invention. The configuration of the constituent blocks of the U3TT 30A is not limited to that shown in FIG. 6. Although the USB 3.0 transaction translator 30A is demonstrated here, the present invention, however, may be adapted to a higher USB version.

In the embodiment, the U3TT 30A includes a USB 2.0 interface (or "device interface") 1301, which is coupled to the device 34 via a USB 2.0 bus (or "device bus") 1302 that is used as a signal interface between the U3TT 30A and the device 34. The U3TT 30 also includes a USB 3.0 interface (or "host interface") 1303, which is coupled to the host 32 via a USB 3.0 bus (or "host bus") 1304 that is used as a signal interface between the U3TT 30A and the host 32.

The U3TT 30A includes at least one buffer 1305, which is made of one or more buffers, disposed between the USB 2.0 interface 1301 and the USB 3.0 interface 1303, for storing data. The U3TT 30A may further include a register 1306, which is used to record configuration information such as descriptor or bandwidth requirement of the USB 2.0 device 34. A controller 1307 of the U3TT 30A not only performs translation but also operates and coordinates the other blocks mentioned above.

According to one aspect of the embodiment, the U3TT 30A includes a start-of-frame (SOF) timer 1309A and a SOF generator 1309B. Specifically, the SOF timer 1309A performs timing control according to a dynamically-adjusted sending period of the SOF packet received from the controller 1307, and the SOF generator 1309B is controlled by the controller 1307 to dynamically generate SOF packets. According to another aspect of the embodiment, the USB 2.0 interface 1301 includes a timing generator 1301A, which is capable of dynamically adjusting bit rate over the USB 2.0 bus 1302.

Figure 7:
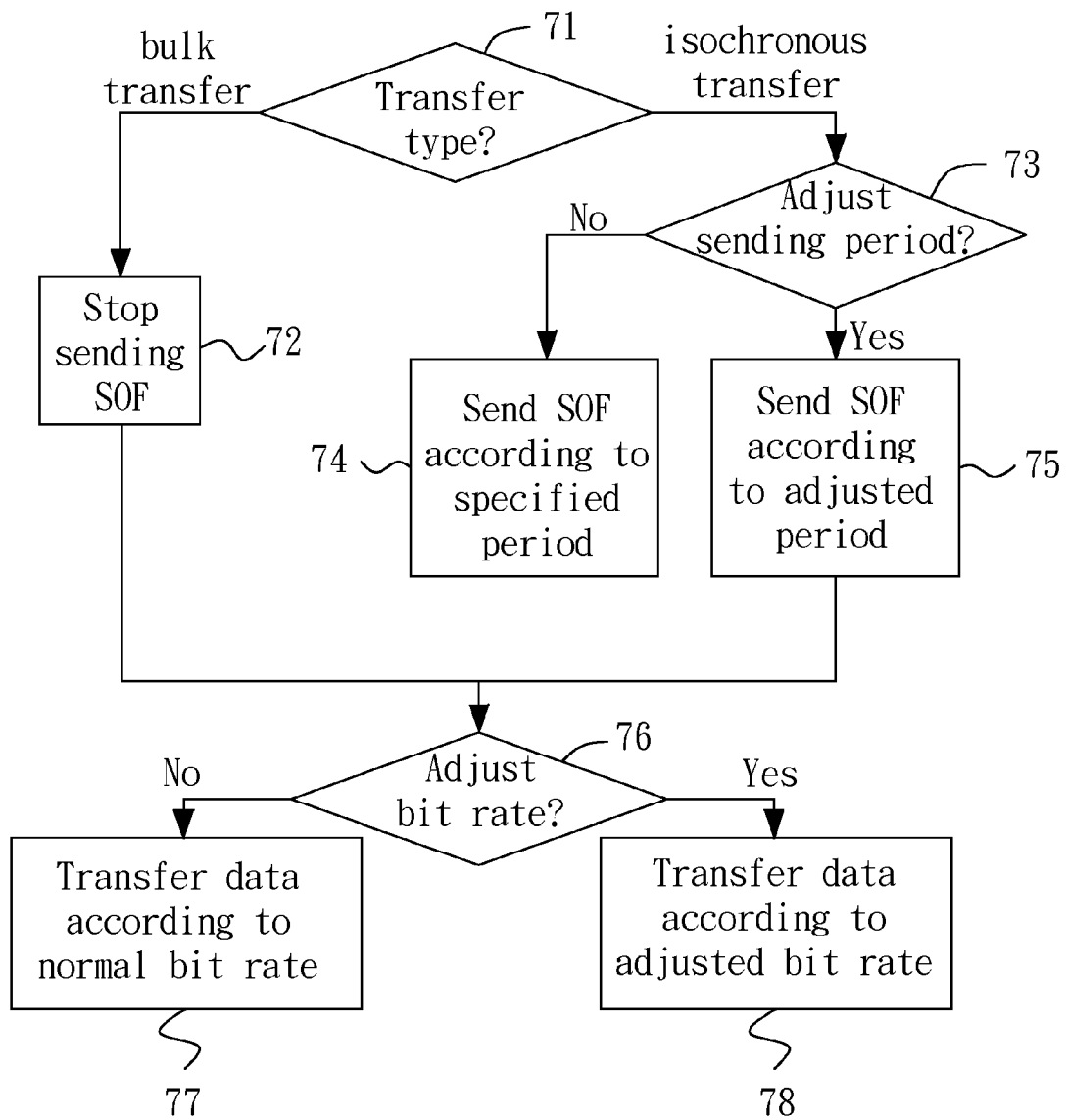
FIG. 7 shows a flow diagram of a USB 3.0 transaction translation method according to the embodiment of the present invention.

FIG. 7 shows a flow diagram of a USB 3.0 transaction translation method according to the embodiment of the present invention. In step 71, the controller 1307 determines information transfer type, for example, according to a descriptor from the device 34 or configuration information from the register 1306. If a bulk transfer is determined in step 71 as the transfer type, the controller 1307 then controls the SOF timer 1309A and the SOF generator 1309B to stop sending SOF packets (step 72). As the device 34 ordinarily does not use the SOF packets in the bulk transfer, the act of stopping the SOF packets can improve transfer performance without affecting data transaction.

If an isochronous transfer is determined in step 71 as the transfer type, the controller 1307 then controls the SOF timer 1309A and the SOF generator 1309B to send SOF packets. Before sending the SOF packets, the controller 1307 determines, in step 73, whether the sending period (e.g., micro-frame time) should be dynamically adjusted. If it is determined that the sending period should not be adjusted, the SOF packets are periodically sent in step 74 according to the micro-frame time (which is 125 µs) as specified in USB specification. If it is determined that the sending period should be adjusted (e.g., lowering the sending period), the SOF packets are periodically sent in step 75 according to the adjusted micro-frame time (e.g., 40% of 125 µs).

FIG. 8A shows an exemplary timing diagram illustrative of sending SOF packets according to the specified micro-frame time, and FIG. 8B shows an exemplary timing diagram illustrative of sending SOF packets according to the adjusted micro-frame time. In isochronous transfer, only a portion (e.g., 40%) of each frame period is normally utilized to perform isochronous data transaction. Accordingly, transaction efficiency adopting the way shown in FIG. 8B may be substantially increased. In other words, the sending period of the SOF packets is the micro-frame time in FIG. 8A, while the sending period of the SOF packets is a portion of the micro-frame time.

In either the bulk transfer (step 72), the isochronous transfer according to the specified micro-frame time (step 74) or the isochronous transfer according to the adjusted micro-frame time (step 75), the embodiment may further include step 76, in which it may be chosen to dynamically adjust bit rate over the USB 2.0 bus 1302 by the timing generator 1301A. If it is chosen not to adjust the bit rate, data are then transferred according to a normal bit rate (step 77). If it is chosen to adjust the bit rate, data are then transferred according to a bit rate that is adjusted (e.g., raised) by altering the clock frequency of the timing generator 1301A (step 78).

It is noted that the bit rate as specified in USB specification has a tolerance such as 10%. Accordingly, the timing generator 1301A in the embodiment may raise its clock frequency, for example, by 10%, thereby improving data transaction efficiency without departing from the specification. In another embodiment, the timing generator 1301A may raise its clock frequency even over the specified tolerance to further data transaction efficiency, although compatibility is lowered.

Although specific embodiments have been illustrated and described, it will be appreciated by those skilled in the art that various modifications may be made without departing from the scope of the present invention, which is intended to be limited solely by the appended claims.

What is claimed is:

1. A Universal Serial Bus (USB) transaction translator, comprising:
    a controller configured to determine whether to adjust a sending period of SOF packets dynamically;
    a start-of-frame (SOF) timer configured to perform timing control according to the dynamically-adjusted sending period of SOF packets from the controller; and
    a SOF generator configured to dynamically generate the SOF packets under control of the controller.

2. The USB transaction translator of claim 1, further comprising:
    a device interface coupled to a device via a device bus; and
    a host interface coupled to a host via a host bus.

3. The USB transaction translator of claim 1, in bulk transfer, the controller controls the SOF timer and the SOF generator to stop sending the SOF packets.

4. The USB transaction translator of claim 1, in isochronous transfer, the controller lowers the sending period of SOF packets, and wherein the adjusted sending period of SOF packets is a portion of a micro-frame time.

5. The USB transaction translator of claim 1, further comprising:
    at least one buffer configured to store data, the controller is configured to access the buffer during the sending period of SOF packets.

6. The USB transaction translator of claim 2, wherein the host has a USB version higher than the USB version of the device.

7. The USB transaction translator of claim 2, wherein the device interface comprises a timing generator configured to dynamically adjust a bit rate over the device bus.

8. The USB transaction translator of claim 2, further comprising a register configured to record configuration information of the device.

9. The USB transaction translator of claim 8, wherein the configuration information is descriptor.

10. A USB transaction translation method, comprising:
    determining an information transfer type;
    dynamically adjusting a sending period of SOF packets when an isochronous transfer is determined as the information transfer type; and periodically sending the SOF packets to the device according to the adjusted sending period.

11. The method of claim 10, further comprising:
coupling a device interface to a device via a device bus; and
coupling a host interface to a host via a host bus.

12. The method of claim 10, when a bulk transfer is determined, as the information transfer type, the SOF packets are stopped from being sent.

13. The method of claim 10, wherein the sending period of the SOF packets is micro-frame time, and wherein the step of dynamically adjusting the sending period of the SOF packets is lowering the micro-frame time.

14. The method of claim 11, wherein the information transfer type is determined according to descriptor from the device or configuration information from a register.

15. The method of claim 11, further comprising a step of dynamically adjusting a bit rate over the device bus.

16. The method of claim 11, a USB version of the host is USB 3.0, and the USB version of the device is USB 2.0.

17. A USB transaction translation method, comprising:
determining whether to adjust a sending period of SOF packets dynamically;
performing timing control according to the dynamically-adjusted sending period of the SOF packets; and
periodically sending the SOF packets according to the adjusted sending period.

18. The method of claim 17, wherein a USB transaction translator is configured to access a buffer during the sending period of SOF packets.

19. The method of claim 17, further comprising:
determining a information transfer type.

20. The method of claim 19, wherein when a bulk transfer is determined as the information transfer type, the SOF packets are stopped from being sent; and when an isochronous transfer is determined as the information transfer type, the sending period of the SOF packets is dynamically adjusted.

* * * * *